(12) United States Patent
Petrole

(10) Patent No.: US 6,379,434 B1
(45) Date of Patent: Apr. 30, 2002

(54) FIBROUS MATERIAL BARRIER FOR A VACUUM

(75) Inventor: William G. Petrole, Marietta, OH (US)

(73) Assignee: Hi-Vac Corporation, Marietta, OH (US)

( * ) Notice: Subject to any disclaimer, the term of this patent is extended or adjusted under 35 U.S.C. 154(b) by 0 days.

(21) Appl. No.: 09/235,775

(22) Filed: Jan. 22, 1999

(51) Int. Cl.⁷ ................................................ B01D 46/00
(52) U.S. Cl. ............................ 95/287; 15/347; 55/320; 55/428; 55/473; 55/482; 55/DIG. 3
(58) Field of Search .......................... 55/319, 320, 321, 55/428, 429, 445, 467, 473, DIG. 3, 482; 15/347, 353; 95/273, 286, 287, 267

(56) References Cited

U.S. PATENT DOCUMENTS

| | | | |
|---|---|---|---|
| 3,853,517 A | * 12/1974 | Mitchell | 55/DIG. 3 |
| 4,718,924 A | * 1/1988 | DeMarco | 55/DIG. 3 |
| 4,726,825 A | * 2/1988 | Natale | 55/DIG. 3 |
| 4,731,101 A | * 3/1988 | Kanda | 55/DIG. 3 |
| 5,259,854 A | * 11/1993 | Newman | 55/320 |
| 5,914,416 A | * 6/1999 | Thode | 55/DIG. 3 |

OTHER PUBLICATIONS

Hi–Vac Corporation product information showing "Industrial Vacuum Systems"—first published on or about Oct. 1997.

Hi–Vac Corporation product information showing "Industrial Vacuum Cleaners"—first published on or about Jan. 1999.

Hi–Vac Corporation product information showing "vacuum, cleaners and conveyors"—first published on or about Jul. 1989.

Hi–Vac Corporation product information showing "powerhead and hopper specifications"—first published on or about Feb. 1981.

* cited by examiner

Primary Examiner—Duane S. Smith
(74) Attorney, Agent, or Firm—Wallenstein & Wagner Ltd.

(57) ABSTRACT

An industrial vacuum assembly suitable for use with waste material hoppers, particularly bin-type hoppers, is described. The assembly includes a vacuum powerhead and a hopper. Mounted between the powerhead and the hopper is a vented partition adapted to collect fiberous material in the hopper and serve as a barrier to restrict the fiberous material from entering into the powerhead. The partition is adapted to disrupt the airflow within the hopper such that fiberous material drawn into the hopper becomes entangled together in the hopper.

13 Claims, 2 Drawing Sheets

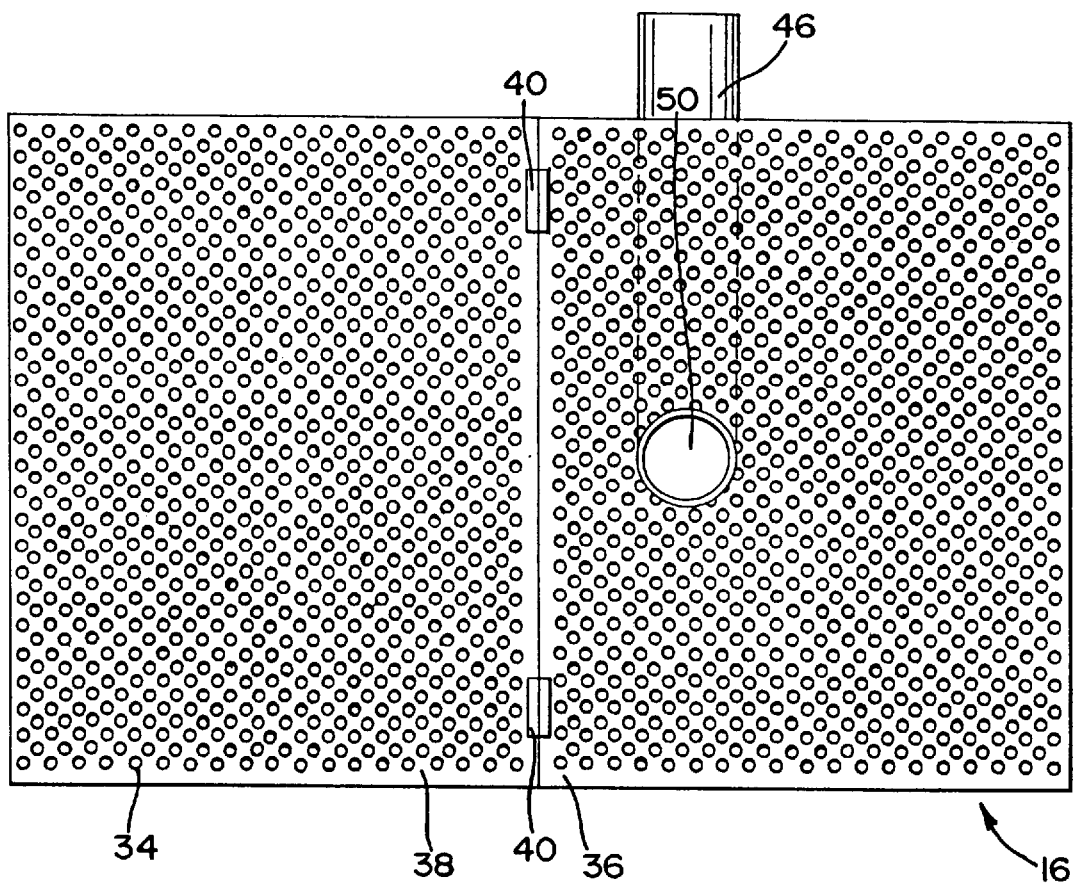
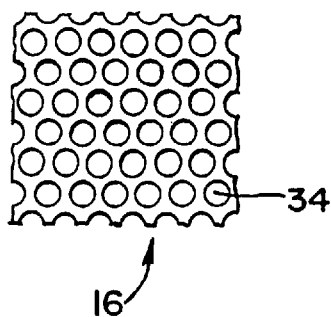

FIBROUS MATERIAL BARRIER FOR A VACUUM

DESCRIPTION

1. Technical Field

The present invention relates to heavy duty industrial vacuum devices for collection of dry particulate waste, and in particular to a heavy duty vacuum device suitable for collecting fibrous waste material and packing the material into a compact bale.

2. Background of the Invention

Industrial vacuums have been developed for collecting waste material including dust, sand, and other substances of varying particulate size and weight. Many of these vacuums separate the waste material from an air stream wherein particles are deposited in a hopper and the air stream is then filtered by a filter, such as a bag filter or a drum filter. The separation process is accomplished by creating an airflow that propels the waste material through a sealed unit that has a hopper and a filter. The heaver particles gather in the hopper because the velocity of the airflow is reduced as it enters the hopper to a level that can no longer propel the heavier particles. Any small particles carried by the air flow are then trapped by the filter.

In collecting waste material containing a large amount of fibrous material, such as fiberglass, the fiberous material is often not deposited in the hopper because the airflow is sufficient to pass the light fibrous material through the hopper toward the filter. Moreover, as the fiberous material gathers at the filter, the air flow through the unit provided by the vacuum source is proportionately reduced because the fibrous material causes blockage of the airflow through the filter.

One example of fiberous material collection being consistently problematic is that of collecting fiberglass waste product during the manufacture of fiberglass insulation. Because the fiberglass is drawn by vacuum into an industrial vacuum assembly and then easily passes beyond the hopper in the air stream in the vacuum assembly, much of the fiberglass is trapped tightly against the filter. The result is that very little of the fiberglass is collected in the hopper and is instead packed against the filter, thereby causing increased resistance of the air stream through the filter and requiring cleaning or replacement of the filter. In the case of disposable filters being used in the vacuum assembly, there is great expense in repeatedly changing the filters. Also, it is often more difficult to gain access to the filter to dispose of the fiberglass than to simply empty the hopper.

Hence, prior to the present invention, a need existed for a vacuum that provided a constant airflow for collecting fibrous material and depositing the material into a large hopper that is easily emptied and to avoid the problems associated with collecting the fiberous material on the filter.

SUMMARY OF THE INVENTION

It is an object of the present invention to provide an industrial vacuum assembly for handling fiber-laden particulate material that includes a hopper having an opening and in fluid communication with a material inlet pipe and a powerhead assembly in fluid communication with the hopper. The assembly has a vacuum source assembly and a filter means, the vacuum source being adapted to cause an air stream through the vacuum assembly in an air stream path. A vented partition is positioned between the hopper and the filter in the stream path, the partition having a plurality of apertures and being adapted to restrict fiberous material from passing through the partition to thereby collect the fiberous material in the hopper.

It is further an object of the present invention to provide an industrial vacuum for handling fiber-laden particulate material that includes a bin-type hopper with a powerhead mounted over the hopper and a planar partition mounted between the hopper and the powerhead. The partition has a plurality of apertures for disrupting the airflow within the hopper, the apertures having insufficient margin for allowing fibers to pass through the partition such that the disrupted airflow within the hopper results in fiber-laden particulate material becoming entangled together and forming a compact bale within the hopper.

Further aspects and advantages of the present invention will be apparent from the following description of preferred embodiments thereof, reference being made to the following drawings.

BRIEF DESCRIPTION OF THE DRAWINGS

FIG. 3 is an upper plan view of the partition according to the present invention; and, FIG. 4 is an upper plan view of a segment of the partition as is shown in FIG. 3.

DETAILED DESCRIPTION

Figure 1:
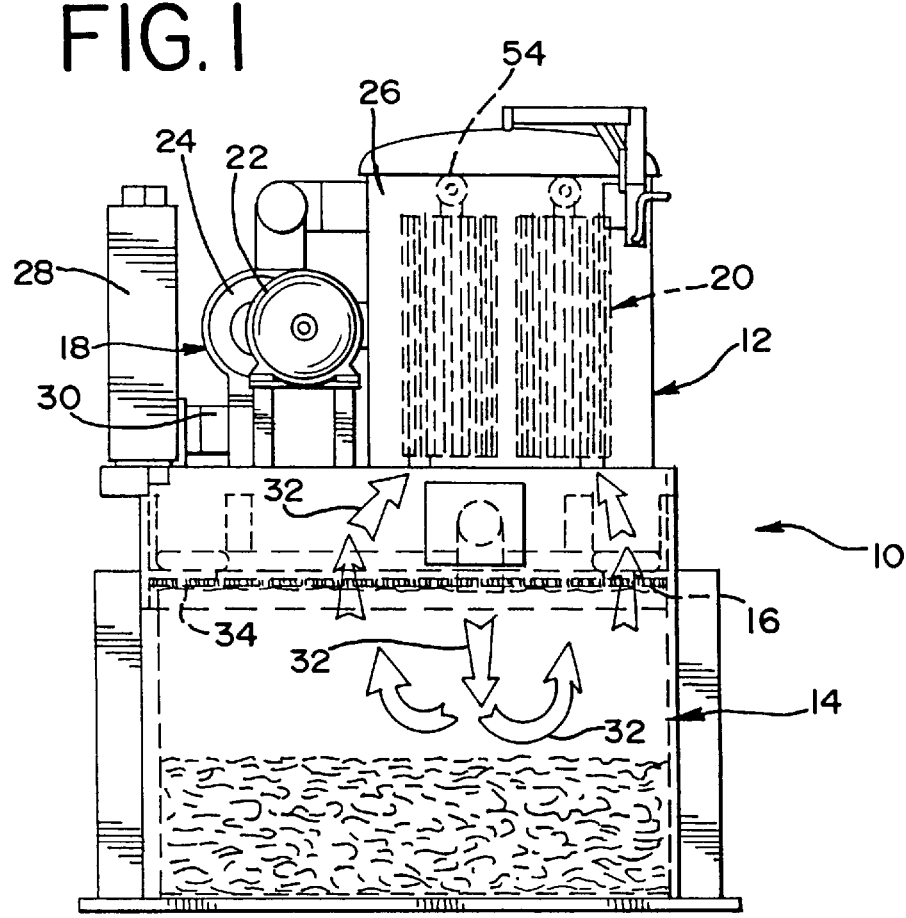
FIG. 1 is a side cross-sectional view of an embodiment of the vacuum assembly in accordance with the present invention.

While this invention is susceptible of embodiments in many different forms, there is shown in the drawings and will be described in detail preferred embodiments of the invention. The present disclosure is to be considered as an exemplification of the principles of the invention, and is not intended to limit the broad aspect of the invention to the embodiments illustrated.

Figure 2:
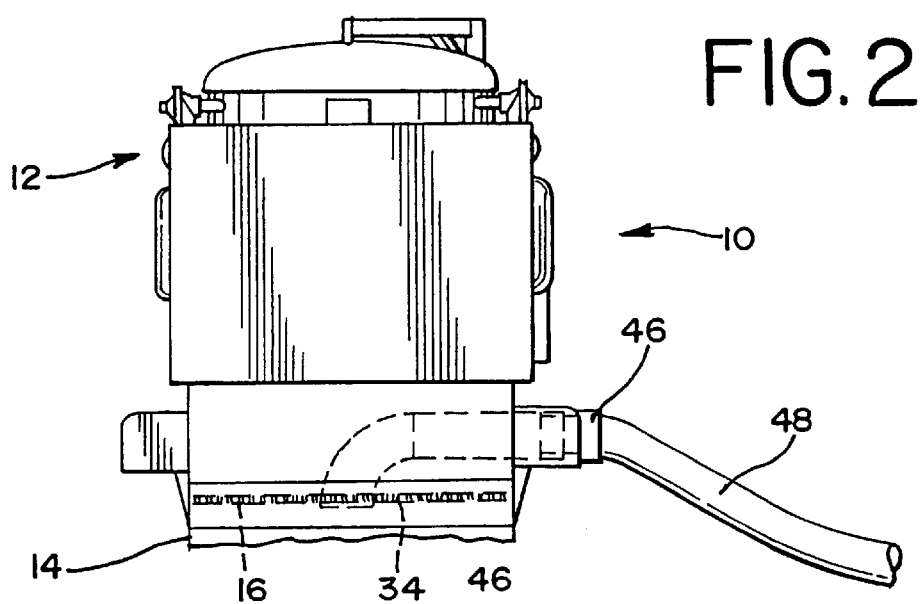
FIG. 2 is an end view of the vacuum unit of FIG. 1, with partial section view of the hopper and with the intake pipe shown in phantom within the assembly.

Referring now to the drawings, and particularly to FIGS. 1–2, an apparatus 10 in accordance with the invention is depicted having a powerhead 12 mounted to a standard bin-type hopper 14. A partition 16 is mounted between the powerhead 12 and the hopper 14.

The powerhead 12 includes a vacuum source 18 and a filter assembly 20. The vacuum source 18 is preferably a common type of vacuum assembly, with an electric drive motor 22 connected to and powering a blower 24 that provides the vacuum for creating a moving airstream within a filter chamber portion 26 of the powerhead 12 and within the hopper 14. Preferably, a silencer 28, or other similar sound absorbing means, is attached to the discharge side of the blower 24 via a silencer conduit 30.

The filter chamber 26 of the powerhead 12 includes a conventional filter assembly 20 for containing particulate material not trapped within the hopper 14. The filter assembly 20 is in fluid communication with the vacuum source 18 and the hopper 14. Preferably, the filter assembly 20 is positioned between the hopper 14 and the vacuum source 18 in relation to the path of the air stream drawn through the assembly 10, the air stream being in the path indicated by the arrows identified as 32. Typical types of such filters include fabric bags or filter cartridges, which either may be emptied and cleaned or may be disposed of when laden with particulate material.

As shown in FIG. 3, the present invention includes a vented partition 16 that is positioned between the filter assembly 20 and the hopper 14. The partition 16 is preferably a thin sheet of metal having apertures 34 to permit the passage of an air stream through the partition 16. In the preferred embodiment, the partition 16 is a thin sheet of steel, approximately 11-gauge metal, with holes punched in the metal. The aperture 34 holes are preferably approximately 0.125 inch in diameter and provide venting opening of approximately 40% of the surface area of the partition 16.

Preferably, the partition 16 consists of two planar metal or metal alloy sections 36 and 38, preferably attached together by a hinge means 64. The partition 16 is preferably mounted to the underside of the filter chamber26, beneath the filter assembly 20, such that the hopper 14 may removed, emptied, and replaced without the need to remove the partition 16. By hinging the sections 36, 38 of the partition 16 together, access to the filter assembly 20 may be quickly obtained by merely removing the bolts securing one of the partition sections 36, 38 and swinging the loosened section open about the hinged connection 40.

The apertures 34 of the partition 16 are preferably patterned in uniform distribution about the surface area of the partition 16. Preferably, each aperture 34 is small enough to prevent the passage of fiberous material through the partition 16, yet large enough to permit relatively large amount of air flow through the partition 16. In the preferred embodiment, there are approximately 30 to 35 number of apertures 34 in a square inch of the partition, in generally even distribution.

The vacuum assembly 10 also includes an intake tube 46 for coupling to a heavy duty flexible hose 48, or a like structure for collection the debris into the assembly 10. The intake tube 46 passes into assembly 10, with an angled segment directing the intake tube 46 toward and through an opening 50 in the partition 16, and a terminal portion of the tube 46 directing the debris directly into the hopper 14.

Accordingly, in operation, the blower 24 of the vacuum source 18 develops a vacuum to cause an air stream 32 in the filter chamber 26 and the hopper 14. Evacuation of the filter chamber 26 and the hopper 14 results in the development of a vacuum throughout the assembly 10, and air stream being drawn through the intake tube 46. Particulate material drawn in through the hose 48 attached to intake tube 46 is directed through the opening 50 of the partition 16 and into the hopper 14. The airflow exiting the opening 50 is initially directed towards the bottom of the hopper 14. However, the air stream 32 must generally reverse direction and exit the top of the hopper 14 through the apertures 34 of the partition 16. As a result, the air stream within the hopper 14 becomes turbulent in a manner that causes fibrous material in the hopper 14 to becoming tangled together into a compact bale. Further, the apertures 34 of the partition 16 restrict the fiberous material from exiting the hopper 14 and entering into the filter chamber 26. Therefore, the fiberous material does not pass through the partition apertures, and, unexpectedly, the fiberous material does not clog the apertures of the partition 16.

The air stream 32 exits the hopper 14 and enters the filter chamber 26 where other small particulates are removed by passage of the air stream 32 through the filter assembly 20. The filtered air is then drawn into the blower intake and expelled from the assembly 10, preferably through the silence means 30.

In the preferred embodiment, the assembly 10 also includes a fill sensor (not shown) for indicating the fill of the hopper 14, and a pressure sensor (not shown) for indicating pressure build-up due to clogged filters of the filter assembly 20. These are preferably of the type typically used in the industry. Further, the assembly 10 preferably includes a reverse pulse means 54 in fluid communication with the filter assembly 20. The reverse pulse means 54 being adapted to force air in a reverse path, opposite the air path 32 through the filters of the filter assembly 20, adapted to force material away from the outer surfaces of the filters to prevent or reduce clogging of the filters. This reverse pulse means 54 is also commonly used in the industry. The addition of the partition 16, positioned between a first region of the assembly including the air intake 46 and the hopper 14 and a second region of the assembly including the filter assembly 20, acts as a fiberous material barrier that effectively reduces the need and usage of a reverse pulse means 54. In other words, the partition 16 positioned in the air stream before the filters reduces the clogging of the filters and increases the efficiency of the assembly 10.

While specific embodiments have been illustrated and described, numerous modifications come to mind without significantly departing from the spirit of the invention. The scope of protection is only limited by the scope of the accompanying claims.

I claim:

1. An industrial vacuum assembly for handling fiber-laden particulate material comprising:

a hopper having an opening and in fluid communication with a material inlet pipe;

a powerhead assembly in fluid communication with said hopper, having a vacuum source assembly and a filter means for containing particulates not trapped within the hopper, said vacuum source being adapted to cause an air stream through the vacuum assembly in an air stream path;

a vented partition positioned proximate to the opening in the hopper and between the hopper and the filter in the stream path, the partition having a plurality of apertures and being adapted to restrict fibrous material from passing though the partition and thereby collecting the fibrous material in the hopper.

2. The industrial vacuum of claim 1 wherein the hopper is a bin chamber.

3. The industrial vacuum of claim 1 wherein the partition includes a plurality of partition member secured together.

4. The vacuum assembly of claim 3, wherein at least one of said plurality of partition members is in hinged connection with another of said partition members.

5. The vacuum assembly of claim 1 wherein the partition comprises a rigid plate having a surface area and having a ratio of openings provided by the apertures, said ratio of openings being approximately 40% of said surface area.

6. The vacuum assembly of claim 1 wherein the apertures comprise a plurality of holes approximately 0.125 inch in diameter.

7. The vacuum assembly of claim 6 wherein the holes are located in the partition in a patterned order to provide apertures that are generally evenly spaced in relation to adjacent apertures.

8. The vacuum assembly of claim 1 wherein the partition comprises a rigid plate formed of 11-gauge metal.

9. An industrial vacuum for handling fiber-laden particulate material comprising:

a hopper having an opening and in fluid communication with a material inlet pipe;

a powerhead mounted over the hopper opening in an airtight relationship and having a filter for containing particulates not trapped within the hopper and a vacuum source for generating an airflow through the hopper and then the powerhead;

a planar partition mounted proximate to the opening in the hopper and within the airflow between the hopper and the powerhead, the partition having a plurality of apertures for disrupting the airflow within the hopper, the apertures having insufficient margin for allowing fibers to pass through the partition; and wherein the disrupted airflow within the hopper results in the fiber-laden particulate material becoming entangled together and forming a compact bale within the hopper.

10. The industrial vacuum of claim 9 wherein the partition comprises a plurality of partition plates.

11. The industrial vacuum of claim 10 wherein at least two of said plurality of plates are connected to together by a hinge means.

12. The industrial vacuum of claim 9 wherein the partition includes an opening for receiving the inlet pipe.

13. A method for handling fiber-laden particulate material comprising the steps of:

providing a powerhead having a vacuum source and a filter;

mounting said powerhead on a sealed engagement with a hopper having an opening;

generating an airflow from said vacuum source to draw an air stream through the hopper and the powerhead;

providing a partition proximate to the opening in the hopper and between the hopper and the powerhead for disrupting the airflow within the hopper with a partition having a plurality of apertures, the apertures having insufficient margin for allowing fibers to pass through the partition;

entangling the fibers together to form a compact bale contained within the hopper;

drawing the airflow within the hopper through a baghouse and then a silencer; and containing particulates within a chamber mounted to the powerhead.

* * * * *

UNITED STATES PATENT AND TRADEMARK OFFICE
CERTIFICATE OF CORRECTION

PATENT NO. : 6,379,434 B1 Page 1 of 1
DATED : April 30, 2002
INVENTOR(S) : Petrole It is certified that error appears in the above-identified patent and that said Letters Patent is hereby corrected as shown below:

Column 1,
Line 21, delete "heaver" and insert -- heavier --

Column 3,
Line 14, delete "chaamber26," and insert -- chamber 26, --
Line 27, insert -- a -- in between "permit" and "relatively"
Line 33, delete "collection" and insert -- collecting --

Column 4,
Line 44, insert -- s -- to "member"

Column 5,
Line 18, delete "to"

Signed and Sealed this

Nineteenth Day of November, 2002

Attest:

JAMES E. ROGAN
Attesting Officer   Director of the United States Patent and Trademark Office